United States Patent
Sakuma et al.

(10) Patent No.: US 12,346,083 B2
(45) Date of Patent: Jul. 1, 2025

(54) INFORMATION PROCESSING APPARATUS, INFORMATION PROCESSING METHOD, PRODUCTION SYSTEM, ARTICLE MANUFACTURING METHOD AND STORAGE MEDIUM

(71) Applicant: CANON KABUSHIKI KAISHA, Tokyo (JP)

(72) Inventors: Kota Sakuma, Kanagawa (JP); Kensuke Uehara, Kanagawa (JP); Shinji Murakami, Tokyo (JP); Yoshiaki Hiraoka, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 801 days.

(21) Appl. No.: 17/193,895

(22) Filed: Mar. 5, 2021

(65) Prior Publication Data
US 2021/0294293 A1 Sep. 23, 2021

(30) Foreign Application Priority Data
Mar. 19, 2020 (JP) ................. 2020-049594

(51) Int. Cl.
G05B 19/05 (2006.01)
G05B 19/042 (2006.01)
G06F 40/18 (2020.01)

(52) U.S. Cl.
CPC ....... G05B 19/056 (2013.01); G05B 19/0426 (2013.01); G06F 40/18 (2020.01);
(Continued)

(58) Field of Classification Search
CPC .............. G05B 19/056; G05B 19/0426; G05B 2219/13044; G05B 2219/13122;
(Continued)

(56) References Cited

U.S. PATENT DOCUMENTS 6,449,624 B1 * 9/2002 Hammack .......... G05B 19/0426
707/999.203
7,143,366 B1 * 11/2006 McKelvey ................ G06F 8/71
715/965
(Continued)

FOREIGN PATENT DOCUMENTS

CN 101281456 A 10/2008
JP 8-16373 A 1/1996
(Continued)

OTHER PUBLICATIONS

Nakagawa Masayuki, "Program Comparator and Program Difference Verification Method" (english translation for application WO2018123039), Dec. 28, 2016, espacenet machine translation (Year: 2016).*

(Continued)

*Primary Examiner* — Christopher W Carter
(74) *Attorney, Agent, or Firm* — VENABLE LLP

(57) ABSTRACT

An information processing apparatus includes a control portion configured to acquire difference information before and after a change of a flowchart when the flowchart has been changed and to output the flowchart into which the difference information is being applied.

12 Claims, 20 Drawing Sheets

(52) U.S. Cl.
CPC .............. *G05B 2219/13044* (2013.01); *G05B 2219/13122* (2013.01)

(58) Field of Classification Search
CPC .................. G06F 40/18; G06Q 10/06311; G06Q 10/103; G06Q 50/04
See application file for complete search history.

(56) References Cited

U.S. PATENT DOCUMENTS

| | | | |
|---|---|---|---|
| 7,703,027 B2* | 4/2010 | Hsu ........................... | G06F 8/34 |
| | | | 717/121 |
| 10,131,055 B2 | 11/2018 | Hashimoto et al. ..... | B23P 21/00 |
| 10,414,050 B2 | 9/2019 | Hashimoto et al. ......................... | |
| | | | G05B 19/41815 |
| 10,518,375 B2 | 12/2019 | Tanaka et al. ... | G05B 19/41815 |
| 2016/0004242 A1* | 1/2016 | Yamaoka ............. | G05B 19/056 |
| | | | 700/86 |
| 2016/0124795 A1 | 5/2016 | Shimizu | |
| 2017/0235302 A1* | 8/2017 | Hozoji ............... | G05B 23/0272 |
| | | | 700/79 |
| 2018/0150046 A1* | 5/2018 | Nagashima .......... | G05B 19/056 |
| 2019/0236233 A1* | 8/2019 | Horikawa .......... | G05B 19/0426 |

FOREIGN PATENT DOCUMENTS

| | | |
|---|---|---|
| JP | H09-212348 A | 8/1997 |
| JP | H10-247107 A | 9/1998 |
| JP | 2000-293208 A | 10/2000 |
| JP | 2005-141778 A | 6/2005 |
| JP | 2012-94087 A | 5/2012 |
| WO | 2018/123039 A | 7/2018 |

OTHER PUBLICATIONS

Izawa Takeshi, "Sequence Control System" (english translation for application JP200093208), Apr. 2, 1999, espacenet machine translation (Year: 1999).*
U.S. Appl. No. 17/197,157, filed Mar. 10, 2021.
U.S. Appl. No. 17/197,146, filed Mar. 10, 2021.
Japanese Office Action issued Dec. 5, 2023 during prosecution of related Japanese application No. 2020-049594 (English-language machine translation included.).
Japanese Office Action issued May 17, 2024 during prosecution of related Japanese application No. 2020-049594 (English-language machine translation included.).
"Research on Mechanical Control System Based on Computer Technology", https://ww.cnki.net, published Apr. 25, 2017. (English abstract included in the document).
Chinese Office Action dated Feb. 28, 2025 during prosecution of related Chinese application No. 202110280104.2 (English machine translation included).

* cited by examiner

FIG.4

| LINE No. | LADDER PROGRAM | |
|---|---|---|
| 0 | LD | M0 |
| 1 | AND | X10 |
| 2 | MOV | K1 D0 |
| 3 | LD | M1 |
| 4 | MPS | |
| 5 | AND | X11 |
| 6 | MOV | K2 D0 |
| 7 | MPP | |
| 8 | ANI | X11 |
| 9 | MOV | K3 D0 |
| 10 | LD | M2 |
| 11 | ANI | Y10 |
| 12 | MOV | K3 D0 |
| 13 | LD | M3 |
| 14 | AND | Y11 |
| 15 | AND | Y12 |
| 16 | MOV | K4 D0 |
| | COMMAND | DEVICE |

FIG.5

| BEFORE CHANGE | 161 |
|---|---|
| LINE No. | LADDER PROGRAM |
| 0 | LD M0 |
| 1 | AND X10 |
| 2 | MOV K1 D0 |
| 3 | LD M1 |
| 4 | MPS |
| 5 | AND X11 |
| 6 | MOV K2 D0 |
| 7 | MPP |
| 8 | ANI X11 |
| 9 | MOV K3 D0 |
| 10 | LD M2 |
| 11 | ANI Y10 |
| 12 | MOV K3 D0 |
| 13 | LD M3 |
| 14 | AND Y11 |
| 15 | AND Y12 |
| 16 | MOV K4 D0 |

| AFTER CHANGE | 171 |
|---|---|
| LINE No. | LADDER PROGRAM |
| 0 | LD M0 |
| 1 | ANI X10 |
| 2 | MOV K1 D0 |
| 3 | LD M1 |
| 4 | AND X11 |
| 5 | MOV K2 D0 |
| 6 | LD M2 |
| 7 | ANI Y10 |
| 8 | AND Y11 |
| 9 | ANI X12 |
| 10 | MOV K3 D0 |
| 11 | LD M3 |
| 12 | ANI Y11 |
| 13 | MOV K4 D0 |

FIG.6

| LINE No. BEFORE CHANGE | LADDER PROGRAM BEFORE CHANGE | LINE No. AFTER CHANGE | LADDER PROGRAM AFTER CHANGE | COMPARISON RESULT |
|---|---|---|---|---|
| 0 | LD M0 | 0 | LD M0 | MATCH |
| 1 | AND X10 | 1 | ANI X10 | MISMATCH |
| 2 | MOV K1 D0 | 2 | MOV K1 D0 | MATCH |
| 3 | LD M1 | 3 | LD M1 | MATCH |
| 4 | MPS | | | DELETE |
| 5 | AND X11 | 4 | AND X11 | MATCH |
| 6 | MOV K2 D0 | 5 | MOV K2 D0 | MATCH |
| 7 | MPP | | | DELETE |
| 8 | ANI X11 | | | DELETE |
| 9 | MOV K3 D0 | | | DELETE |
| 10 | LD M2 | 6 | LD M2 | MATCH |
| 11 | ANI Y10 | 7 | ANI Y10 | MATCH |
| | | 8 | AND Y11 | ADD |
| | | 9 | ANI X12 | ADD |
| 12 | MOV K3 D0 | 10 | MOV K3 D0 | MATCH |
| 13 | LD M3 | 11 | LD M3 | MATCH |
| 14 | AND Y11 | 12 | ANI Y11 | MISMATCH |
| 15 | AND Y12 | | | DELETE |
| 16 | MOV K4 D0 | 13 | MOV K4 D0 | MATCH |

FIG.7

| | LINE No. | LADDER PROGRAM | |
|---|---|---|---|
| BLOCK 0 | 0 | LD M0 | |
| | 1 | AND X10 | |
| | 2 | MOV K1 D0 | |
| BLOCK 1 | 3 | LD M1 | |
| | 4 | MPS | |
| | 5 | AND X11 | |
| | 6 | MOV K2 D0 | |
| | 7 | MPP | |
| | 8 | ANI X11 | |
| | 9 | MOV K3 D0 | |
| BLOCK 2 | 10 | LD M2 | |
| | 11 | ANI Y10 | |
| | 12 | MOV K3 D0 | |
| BLOCK 3 | 13 | LD M3 | |
| | 14 | AND Y11 | |
| | 15 | AND Y12 | |
| | 16 | MOV K4 D0 | |

161 — table label

CIRCUIT BLOCK

FIG.10

| LADDER PROGRAM COMMAND | NEXT CIRCUIT ELEMENT SETTING METHOD |
|---|---|
| LD | - |
| AND | SET NEXT CIRCUIT ELEMENT OF PREVIOUS CIRCUIT ELEMENT |
| ANI | SET NEXT CIRCUIT ELEMENT OF PREVIOUS CIRCUIT ELEMENT |
| MPS | SET NEXT CIRCUIT ELEMENT AS NEXT CIRCUIT ELEMENT OF PREVIOUS CIRCUIT ELEMENT |
| MPP | SET NEXT CIRCUIT ELEMENT AS NEXT CIRCUIT ELEMENT OF PREVIOUS CIRCUIT ELEMENT CORRESPONDING MPS |
| MOV | SET NEXT CIRCUIT ELEMENT OF PREVIOUS CIRCUIT ELEMENT |
| : | : |

| DEVICE | DEVICE USAGE | No. |
|---|---|---|
| D0 | STEP OPERATION CONTROL REGISTER | 0 |
| M0 | STEP DEVICE | 0 |
| M1 | STEP DEVICE | 1 |
| : | : | : |
| M99 | STEP DEVICE | 99 |
| M100 | STEP DEVICE | 100 |

| CIRCUIT ELEMENT POSITION | CIRCUIT ELEMENT USAGE | CIRCUIT ELEMENT EXTRACT INFORMATION |
|---|---|---|
| START | STEP DEVICE ON | STEP DEVICE No. |
| END | UPDATE STEP OPERATION CONTROL REGISTER BY NUMERICAL VALUE F | NEXT STEP DEVICE No. = NUMERICAL VALUE F |
| OTHER | - | CONDITION |

| LINE No. BEFORE CHANGE | LADDER PROGRAM BEFORE CHANGE | LINE No. AFTER CHANGE | LADDER PROGRAM AFTER CHANGE | COMPARISON RESULT |
|---|---|---|---|---|
| 0 | LD M0 | 0 | LD M0 | MATCH |
| 1 | AND X10 | 1 | ANI X10 | MISMATCH |
| 2 | MOV K1 D0 | 2 | MOV K1 D0 | MATCH |
| 3 | LD M1 | 3 | LD M1 | MATCH |
| 4 | MPS | | | DELETE |
| 5 | AND X11 | 4 | AND X11 | MATCH |
| 6 | MOV K2 D0 | 5 | MOV K2 D0 | MATCH |
| 7 | MPP | | | DELETE |
| 8 | ANI X11 | | | DELETE |
| 9 | MOV K3 D0 | | | DELETE |
| 10 | LD M2 | 6 | LD M2 | MATCH |
| 11 | ANI Y10 | 7 | ANI Y10 | MATCH |
| | | 8 | AND Y11 | ADD |
| | | 9 | ANI X12 | ADD |
| 12 | MOV K3 D0 | 10 | MOV K3 D0 | MATCH |
| 13 | LD M3 | 11 | LD M3 | MATCH |
| 14 | AND Y11 | 12 | ANI Y11 | MISMATCH |
| 15 | AND Y12 | | | DELETE |
| 16 | MOV K4 D0 | 13 | MOV K4 D0 | MATCH |
| FLOWCHART BEFORE CHANGE | | FLOWCHART AFTER CHANGE | | |

INFORMATION PROCESSING APPARATUS, INFORMATION PROCESSING METHOD, PRODUCTION SYSTEM, ARTICLE MANUFACTURING METHOD AND STORAGE MEDIUM

BACKGROUND OF THE INVENTION

Field of the Invention

The present invention relates to an information processing apparatus.

Description of the Related Art

An automatic assembling apparatus for example implements sequence control that serially advances operations of units in accordance to a procedure set in advance. A controller called as a sequencer or a programmable logic controller (PLC) is mainly used as means for sequentially controlling the automatic assembling apparatus. Then, as a programming language thereof, a ladder program is being widely used. In designing the ladder program, there is a case where the ladder program is changed to correct malfunctions or to add functions from a field-work for example even after completing implementation of the program into the automatic assembling apparatus. Then, there is a possibility of causing a new malfunction due to the change of the ladder program. In such a case, a work for comparing the ladder programs before and after the change is often carried out to specify different parts and to correct the ladder program.

As a technology for specifying the different parts of the ladder program, Japanese Patent Application Laid-open No. 2012-094087 proposes a technology that enables to readily perceive the different parts by automatically extracting different parts from a plurality of ladder programs and by automatically generating documents describing the different parts.

The above-mentioned Japanese Patent Application Laid-open No. 2012-094087 intends to enhance efficiency in specifying the different parts and to facilitate preparation and edition of the documents describing the different parts. However, it is necessary to investigate influential ranges before and after the different parts and it is not easy to evaluate an influence given by the different parts to the whole ladder program just by specifying the different parts of the ladder program. Due to that, there is a case where an enormous amount of manual work time is required to specify the influential range of the different parts.

By the way, a flowchart is known as a representation form that visualizes algorithm of, not only the ladder program, but also of programs used in various controllers. There is a case where a problem of the algorithm is exposed by outputting the flowchart through printing or on a display, and the flowchart is often useful in various aspects of comparing, examining and debugging the algorithm.

SUMMARY OF THE INVENTION

According to a first aspect of the present invention, an information processing apparatus includes a control portion configured to acquire difference information before and after a change of a flowchart when the flowchart has been changed and to output the flowchart into which the difference information is being applied.

According to a second aspect of the present invention, an information processing method executed by a control portion, includes acquiring difference information before and after a change of a flowchart when the flowchart has been changed, and outputting the flowchart into which the difference information is being applied.

Further features of the present invention will become apparent from the following description of exemplary embodiments with reference to the attached drawings.

BRIEF DESCRIPTION OF THE DRAWINGS

FIG. 4 illustrates one example of the ladder program in a mnemonic form of the present exemplary embodiment.

FIG. 5 illustrates one example of ladder program information before and after changes in the mnemonic form of the present exemplary embodiment.

FIG. 6 illustrates difference information of the ladder program before and after the changes in the mnemonic form of the present exemplary embodiment.

FIG. 7 illustrates ladder program information divided into blocks in the mnemonic form of the present exemplary embodiment.

FIG. 10 illustrates one example of definition information correlating ladder program commands with next circuit element setting methods of the present exemplary embodiment.

FIG. 11 illustrates one example of device usage definition information of the present exemplary embodiment.

FIG. 12 illustrates one example of circuit block pattern definition information of the present exemplary embodiment.

FIG. 17 illustrates a display area as one example of flowchart comparison outputs of the present exemplary embodiment.

DESCRIPTION OF THE EMBODIMENTS

A mode for carrying out the present disclosure will be described with reference to the appended drawings. Note that a configuration described below is one example to the end, and a detailed configuration for example may be appropriately modified by a person skilled in the art within a scope not departing from a gist of the present disclosure. Still further, numerical values taken up in the present exemplary embodiment are merely examples of referential numerical values.

Figure 20:
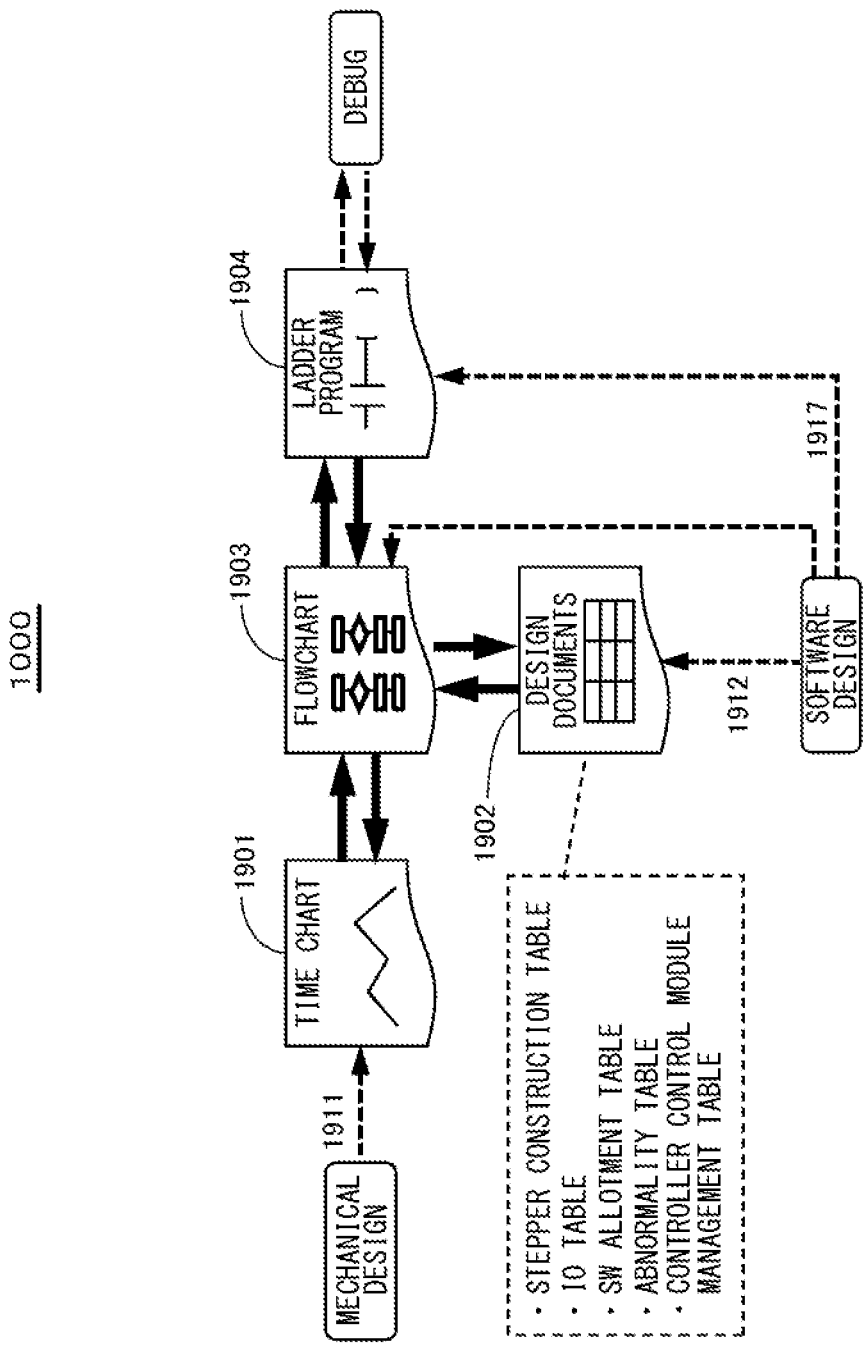
FIG. 20 illustrates one example of a workflow in a processing system of the ladder program.

FIG. 20 is a schematic diagram illustrating a workflow of development and design works of a ladder program, i.e., a sequence program. A mechanical designer performing various design works related to hardware of production devices prepares a time chart 1901 by a time chart preparing work 1911. Sequence and dependency by which each production device is operated in production steps are described in the time chart 1901. Receiving the completed time chart 1901, a software designer starts design works.

Here, the software designer performs a design documents preparing work 1912 to prepare design documents 1902 that turns out to be a stepper construction table, an IO table, a SW allotment table, an abnormality table, a controller control module management table and others. Still further, the software designer prepares or automatically generates a flowchart 1903 based on the design documents 1902 composed of the stepper construction table, the IO table, the SW allotment table, the abnormality table, the controller control module management table and others and on the time chart 1901. Note that in a case of automatically generating the flowchart 1903 from the time chart 1901, there is a case where such a process of automatically describing design information from the design documents 1902 into the flowchart 1903 is performed in a manner of adding differences.

Then, the software designer verifies the prepared flowchart 1903 and upon examining an apparatus specification, corrects the flowchart 1903 corresponding to branch conditions, standby conditions, processing contents after being branched by the branch conditions and the like.

Next, the software designer describes and edits the ladder program 1904 by a dedicated editor or the like by making reference to the flowchart 1903 and the design documents 1902. Alternately, there is also a case of automatically generating the ladder program 1904 corresponding to the flowchart 1903 and the design documents 1902. Note that there is also a case of slightly correcting the flowchart 1903 and the design documents 1902 on which the ladder program 1904 is based as indicated by an arrow in a left direction in FIG. 17 in response to debugging, preparation and edition of the ladder program 1904. Finally, the software designer performs verification works 1917 of the ladder program 1904 and ends the design flow.

After making the verification works 1917 or various changes, the ladder program after the change is sent to a sequencer or PLC serving as a sequence control unit that controls the production devices. Then, production devices of the production line, i.e., the production system, can manufacture articles such as industrial products.

FIG. 20 described above schematically illustrates a workflow of the development and design works performed during a period starting from mechanical design of the production devices until when the devices are installed and operated in the production line. Therefore, a preparation flow related to the time chart 1901, the flowchart 1903 and the design documents 1902 belonging to the document group is also illustrated in FIG. 20. However, as for maintenance of the devices of the production line in operation, there is a case where the definition information 1904 is directly edited or changed without works related to the documents. Because such work has no documents corresponding to a state after the change, there is a case where it is difficult to specify an influential range of the change made on the definition information 1904 for example.

Then, according to the present exemplary embodiment, an arrangement is made so as to generate a flowchart into which difference information before and after the change is applied corresponding to the change of the ladder program and to output the flowchart through a user interface. This arrangement enables to readily evaluate contents of the change of the ladder program and to specify the influential range thereof for example.

An exemplary configuration of a ladder program comparing apparatus will be described below. This ladder program comparing apparatus outputs a flowchart containing difference information of ladder programs before and after a change. While the flowchart may be outputted arbitrarily in any form such as printing, network transmission of data and displaying on a screen, the form of displaying on a screen is illustrated below. A ladder program comparing process of the present exemplary embodiment may be implemented on a single information processing apparatus for example. The ladder program comparing process of the present exemplary embodiment may be also implemented as a function of an arbitrary unit contained in a system handling the ladder program, e.g., of a control unit such as a PLC and a sequencer.

Figure 1:
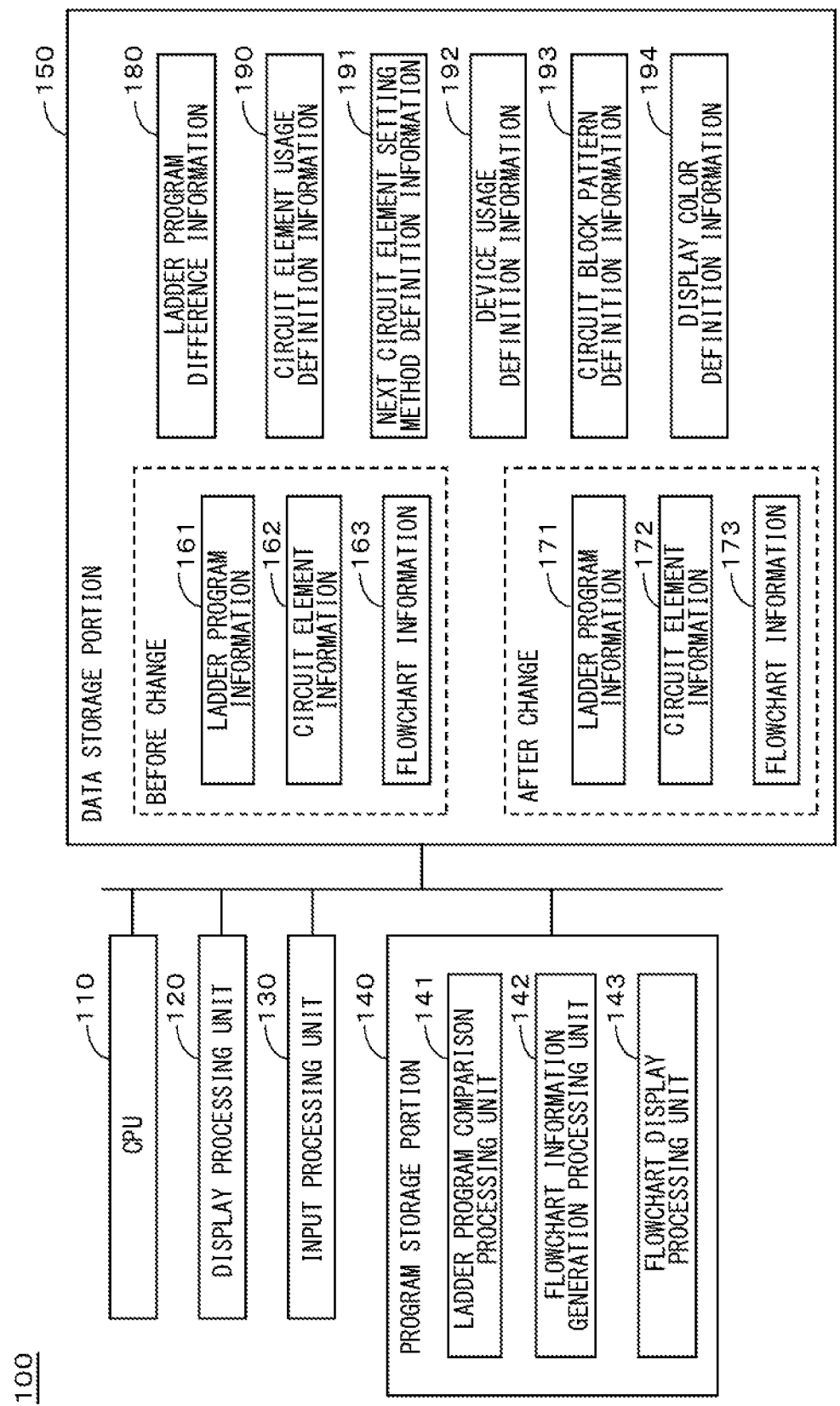
FIG. 1 is a block diagram illustrating a configuration of a ladder program comparing apparatus of the present exemplary embodiment of the present disclosure.

FIG. 1 is a block diagram illustrating one example of a configuration of a ladder program comparing apparatus 100 of the present exemplary embodiment. The ladder program comparing apparatus 100 includes a CPU 110, a display processing unit 120, an input processing unit 130, a program storage portion 140 and a data storage portion 150. The CPU 110 is a subject that executes the ladder program comparing process of the present exemplary embodiment and executes arithmetic operation in accordance to a control program described later. The display processing unit 120 executes a process for displaying information on a display unit such as a display. The input processing unit 130 processes information inputted from an input unit such as a keyboard and a mouse corresponding to the input operated by an operator.

A ladder program comparison processing unit 141, a flowchart information generation processing unit 142 and a flowchart display processing unit 143 are stored in the program storage portion 140. Processes executed by these processing units stored in the program storage portion 140 are described as the control programs executed by the CPU 110 for example. A disk medium and a memory medium storing the control programs of the present exemplary embodiment composes a computer-readable storage medium of the present disclosure.

Ladder program information 161, circuit element information 162 and flowchart information 163 before a change and ladder program information 171 and circuit element information 172 after the change are stored in the data storage portion 150. Flowchart information 173, ladder program difference information 180, circuit element usage definition information 190 and next circuit element setting method definition information 191 are stored also in the data storage portion 150. The data storage portion 150 also stores device usage definition information 192, circuit block pattern definition information 193 and display color definition information 194.

Figure 2:
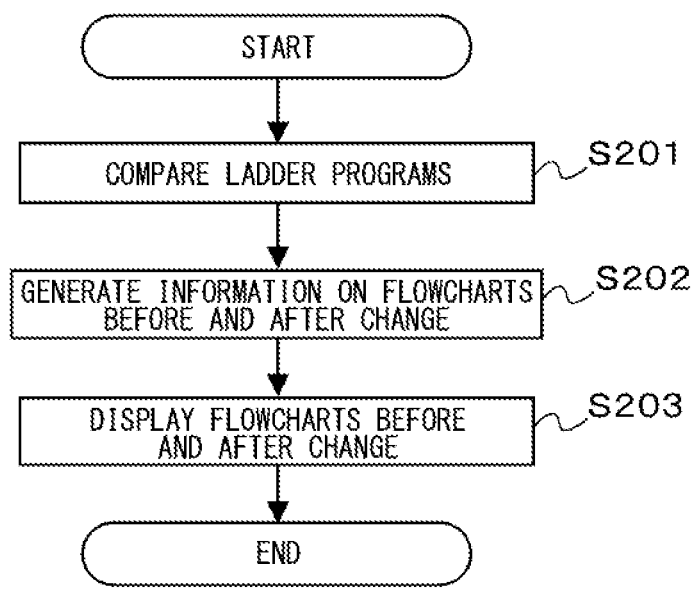
FIG. 2 is a flowchart illustrating a flow of an entire process in comparing the ladder programs of the present exemplary embodiment.

FIG. 2 is a flowchart illustrating a flow of an entire process in comparing the ladder programs. In Step S201 in FIG. 2, the ladder program comparison processing unit 141 compares the ladder program information 161 with the ladder program information 171 to generate the ladder program difference information 180.

In Step S202, the flowchart information generation processing unit 142 functioning as a flowchart generating portion generates the flowchart information 163 and the flowchart information 173 from the ladder program information 161 and the ladder program information 171.

In Step S203, the flowchart display processing unit 143 generates information for displaying a flowchart into which the difference information is applied from the flowchart information 163, the flowchart information 173 and the ladder program difference information 180.

Figure 3:
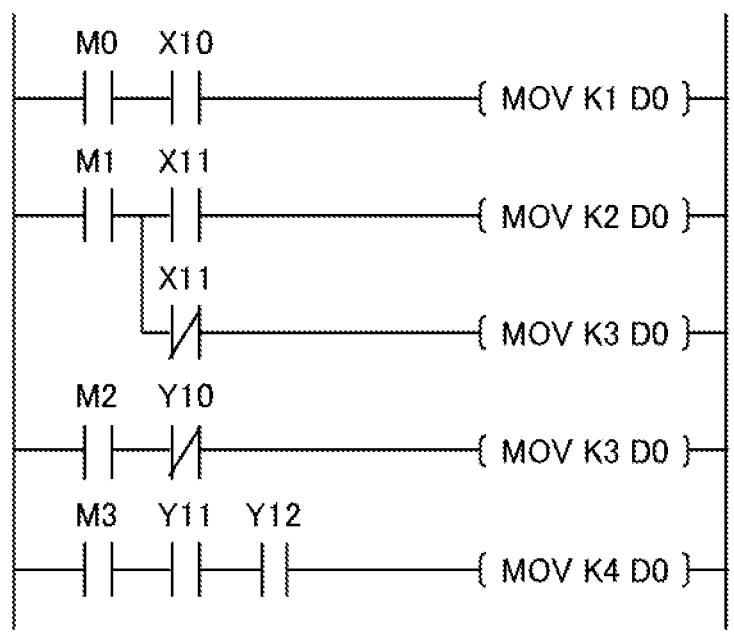
FIG. 3 illustrates a ladder diagram as a representation or an output example of the ladder program of the present exemplary embodiment.

FIG. 3 illustrates a ladder chart used for controlling the automatic assembling apparatus such as a robot and a conveyance unit by a control unit such as a programmable logic controller (PLC) and a sequencer in a form of a ladder chart 300. While the ladder chart 300 in FIG. 3 is often called as a ladder circuit diagram, this is a form of illustration used in displaying on a screen or in printing. The control unit such as the programmable logic controller (PIC) and the sequencer is described by program texts in a step control system in a memory for example. In the present exemplary embodiment, the ladder programs before and after the change are compared by setting the ladder programs described by such step control system as objects to be processed.

There is a case where a part of the ladder program is changed by a field-work after implementing the ladder program on the control unit such as the programmable logic controller (PLC) and the sequencer. In a case where the ladder program is to be changed by such work, the form of the ladder chart 300 is used on a GUI of a work station for example. For instance, in a case where a malfunction is generated in an operation of the automatic assembling apparatus disposed in the production line, the ladder program is sometimes changed by the field-work.

In such a case, the change is often made directly to the ladder program in question without changing documents and the flowchart related to the ladder program. While the documents and the flowchart are maintained after recovering the automatic assembling apparatus of the production line, it is convenient if the flowchart can be automatically generated and outputted in response to the change of the ladder program for example. There is also a case where the ladder program has to be repeatedly changed while searching where a problem is without immediately recovering the automatic assembling apparatus even if one or several parts of the ladder program have been changed by the field-work.

The present exemplary embodiment is arranged such that the flowchart is automatically generated and outputted corresponding to the change of the ladder program. This arrangement may make it possible to readily specify a part affected by the change and to readily verify whether the change of the ladder program is appropriate. Still further, according to the present exemplary embodiment, in a case where the flowchart generated corresponding to the change of the ladder program is outputted, the flowchart containing the difference information related to the change is outputted. This arrangement makes it possible to remarkably improve workability related to the change and edition of the ladder program.

FIG. 4 illustrates one example in which the ladder chart 300 illustrated in FIG. 3 is described as the ladder program information 161 in a mnemonic form. In a case where the ladder program information 161 is actually recorded on a memory, binary codes corresponding to the mnemonic form as illustrated in FIG. 4 for example are recorded. In the form of FIG. 4, Line No. and Command and Device as constructional elements of the ladder program are described in each line of the ladder program.

FIG. 5 illustrates statuses when the ladder program is changed. FIG. 5 illustrates one example of the ladder program information 161 before the change and of the ladder program information 171 after the change. In the change and edition of the ladder program, the ladder program information 171 after the change is generated by partially removing steps of the ladder program information 161 before the change.

Note that the display formats as illustrated in FIGS. 4 and 5 may be used as a display output form of a dedicated ladder program editor for example. It is possible to perform a work for changing the ladder programs as illustrated in FIG. 5 by such editor. It is also possible to perform the work for changing the ladder programs as illustrated in FIG. 5 by editing program texts mnemonically rendering the ladder program.

According to the present exemplary embodiment, ladder program difference information, i.e., program difference information, is extracted by setting the ladder program information 161 and 171 before and after the change as illustrated in FIG. 5 as input information to generate flowchart difference information and to use in displaying flowcharts.

It is possible to generate this ladder program difference information by the ladder program comparison processing unit 141 in FIG. 1. FIG. 6 illustrates one example or the ladder program difference information 180 generated by the ladder program comparison processing unit 141. In the example in FIG. 6, the ladder program difference information 180 includes, in each column from a left column to a right column, Line No. before the change, Ladder program before change, Line No. after the change, Ladder program after the change and Comparison result, respectively.

The ladder program comparison processing unit 141 compares the ladder programs with each other from the ladder program information 161 before the change and the ladder program information 171 after the change in FIG. 5. Then, based on the comparison result, the ladder program comparison processing unit 141 records the comparison result per each line in a column of Comparison result of the ladder program difference information 180, i.e., in Step S201 in FIG. 2. At this time, as items described in the Comparison result, each flag, i.e., identification information, of "Match" is generated in a case where the ladder program information after the change is equal to the ladder program information before the change and a flag of "Mismatch" is generated in a case where the ladder program information after the change is not equal to the ladder program information before the change. Still further, a flag, i.e., identification information of "Add" is generated in a case where ladder program information exists only after the change with respect to ladder program information before the change and a flag, i.e., identification information, of "Delete" is generated as third information in a case where there exists no ladder program information after the change with respect to the ladder program information before the change.

Meanwhile, FIG. 7 illustrates the ladder program information 161 before the change and divided per circuit block. The ladder program can be divided per circuit block depending on an object on which a ladder program command acts. For instance, the ladder program information 161 in FIG. 7 is divided into circuit blocks by being delimited by a ladder program command "LD".

Figure 8:
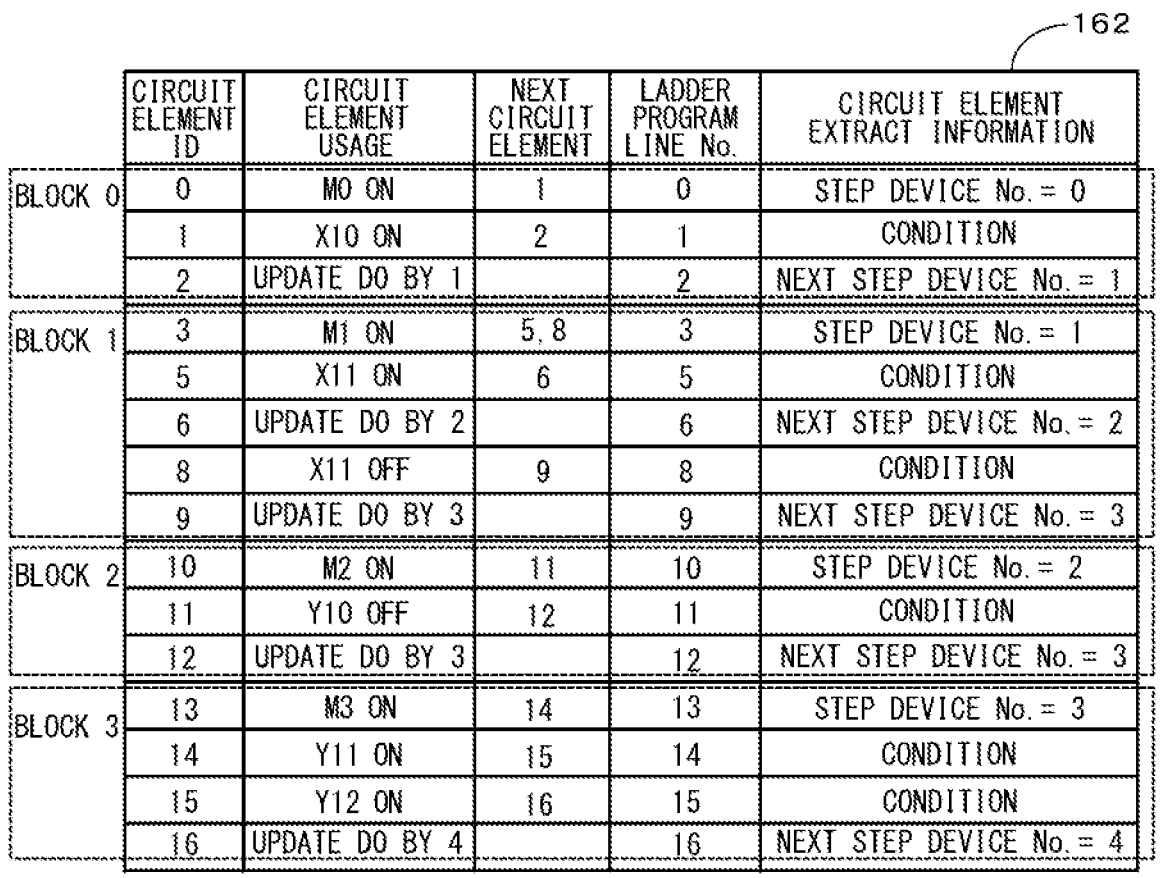
FIG. 8 illustrates one example of configuration of circuit element information in a mnemonic form of the present exemplary embodiment.

FIG. 8 illustrates one example of the circuit element information 162 which also corresponds to the circuit element information 172 in FIG. 1. The circuit element information 162 in FIG. 8 describes information on a circuit element in one line, and each column includes, in order from the left, Circuit element ID, Circuit element usage, Next circuit element, Corresponding ladder program line No. and Circuit element extract information.

Figure 9:
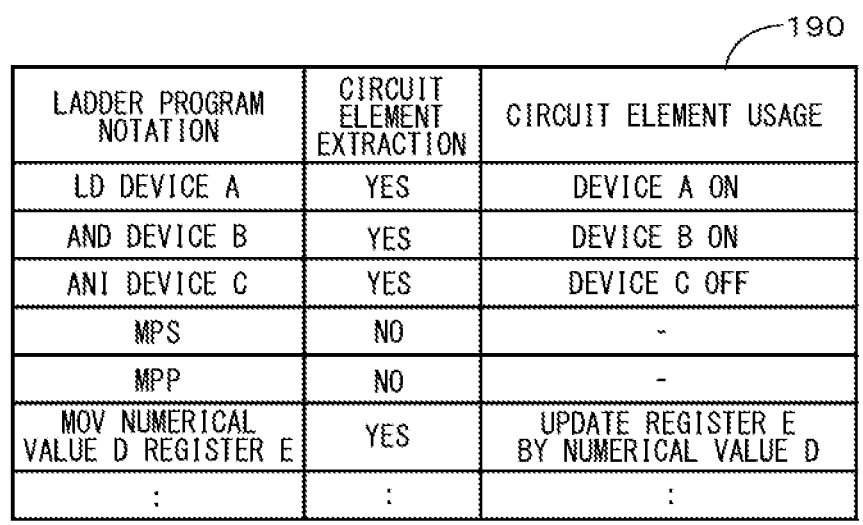
FIG. 9 illustrates one example of circuit element usage definition information of the present exemplary embodiment.

FIG. 9 illustrates one example of the circuit element usage definition information 190. In the circuit element usage definition information 190, whether extraction from a circuit element is made and circuit element usage is defined in a case where the circuit element is extracted with respect to Ladder program notation indicated in a leftmost column.

FIG. 10 illustrates one example of the next circuit element setting method definition information 191 in FIG. 1. In the next circuit element setting method definition information 191, a next circuit element setting method of a circuit element on which mnemonic of ladder program command indicated in a leftmost column acts or per mnemonic correlating the circuit element in particular is defined.

FIG. 11 illustrates one example of the device usage definition information 192 in FIG. 1. As for a specific device, the device usage definition information 192 defines a usage of the device and Identification No. of the device.

FIG. 12 illustrates one example of the circuit block pattern definition information 193 in FIG. 1. The circuit block pattern definition information 193 defines information to be extracted from a circuit element corresponding to Circuit element position and Circuit element usage at leftmost and center columns in the circuit block. FIG. 12 illustrates design pattern information of a step circuit block in step control as one example. Circuit element position at the leftmost column indicates a position within a circuit block from a relationship among the circuit elements, and a circuit element position "Start" in particular corresponds to a circuit element not set as a next circuit element of another circuit element. A circuit element position of "End" corresponds also to a circuit element for which none of next circuit element is set. A circuit element position "Other" corresponds to a circuit element not corresponding to "Start" nor "End".

Figure 13:
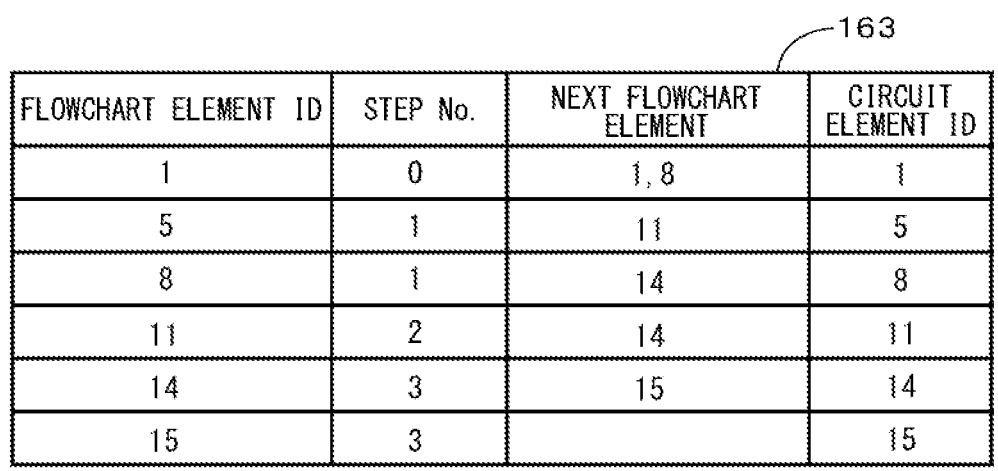
FIG. 13 illustrates one example of flowchart information of the present exemplary embodiment.

FIG. 13 illustrates a structural example of the flowchart information 163 which is capable of rendering graphics of the flowchart. The flowchart information 163 includes Flowchart element ID, Step No., Next flowchart element and Circuit element ID from a left column to a right column in a form of describing information of flowchart elements in one line.

Figure 14:
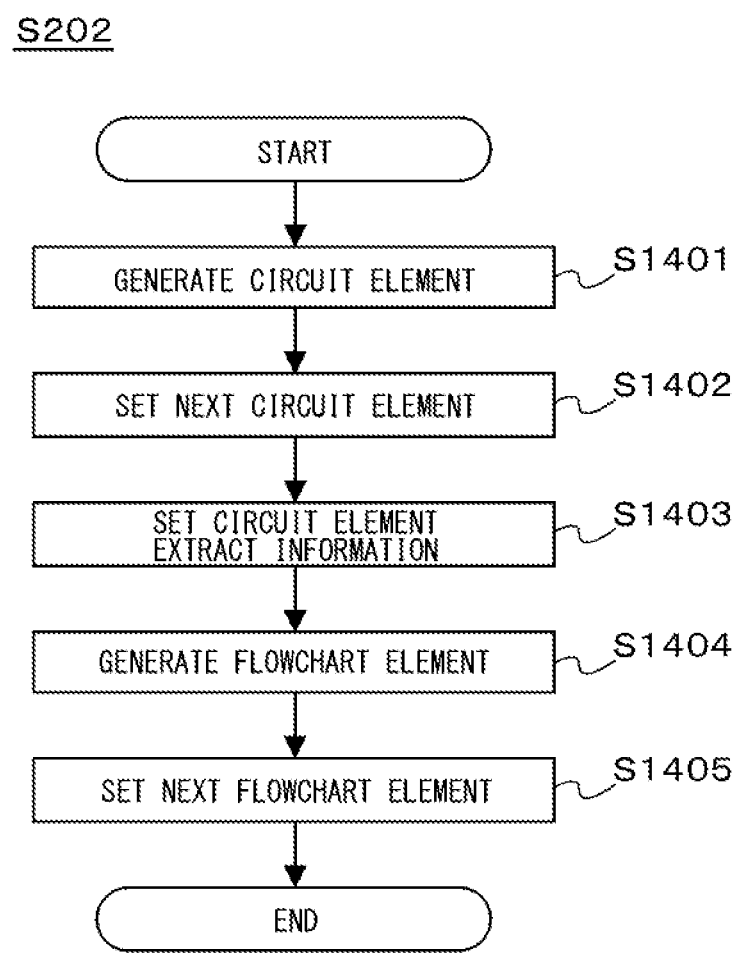
FIG. 14 is a flowchart illustrating a flow of processes of a flowchart information generating processing unit of the present exemplary embodiment.

FIG. 14 is a flowchart illustrating a flow of processes of the flowchart information generating processing unit describing Step S202 in FIG. 2 in detail. It is possible to generate the flowchart information 163 from the ladder program information 161 in FIG. 7 by a control procedure as illustrated in FIG. 14.

In Step S1401 in FIG. 14, each line of ladder program of circuit blocks is analyzed to extract a circuit element and a circuit element usage from the ladder program notation based on the circuit element usage definition information 190 in FIG. 9 to generate a circuit element. A unique circuit element ID is applied to the circuit element. A ladder program line No. corresponding to the circuit element is set to enable to mutually track the circuit element ID and the ladder program line No.

Here, a case of analyzing "LD MI" of the ladder program line No. 3 in FIG. 7 will be described. Because this "LD MI" corresponds to "LD device A" in the ladder program notation in the circuit element usage definition information 190 in FIG. 9 and is a circuit element extract object, the circuit element usage is extracted as "MI ON" and a circuit element thereof is generated.

In Step S1402 in FIG. 14, each line of the ladder program of the circuit block is analyzed to set ID of a circuit element, corresponding to a next circuit element, to the next circuit element of the circuit element extracted in Step S1401 based on the next circuit element setting method definition information 191 in FIG. 10. Here, an analysis of the ladder program line Nos. 3, 4 and 5 in FIG. 7 will be described as an example. Ladder program commands continue as "LD", "MPS" and "AND" in the ladder program line Nos. 3, 4 and 5. Therefore, according to the next circuit element setting method definition information 191 in FIG. 10, next circuit element setting methods of these commands correspond to "-", "Set next circuit element as next circuit element of previous circuit element" and "Set as next circuit element of previous circuit element", respectively. Accordingly, in this case, Circuit element ID 5 corresponding to Ladder program line No. 5 is set to the next circuit element of the circuit element ID 3 corresponding to the ladder program line No. 3.

In Step S1403 in FIG. 14, a circuit element in FIG. 8 for example is analyzed to extract information from the circuit element usage and to set circuit element extract information based on the device usage definition information 192 in FIG. 11 and the circuit block pattern definition information 193 in FIG. 12. Here, the circuit element usage "Update DO by 2" of Circuit element ID 6 in FIG. 8 is analyzed for example. According to the device usage definition information 192 in FIG. 11, DO corresponds to "Step operation control register". The circuit element ID 6 corresponds to "End" and "Update step operation control register by numerical value F" according to the circuit block pattern definition information 193 in FIG. 12. Therefore, it is possible to extract "No. of next step device=2" and to set as circuit element extract information.

In Step S1404 in FIG. 14, the ladder program circuit element information 162 in FIG. 8 is analyzed to extract what the circuit element extract information is "Condition" to generate a flowchart element. A flowchart element ID which sets a flowchart element to be unique is applied to the flowchart element of a specific step. A circuit element ID corresponding to a flowchart element is also set to enable to mutually track the flowchart element ID and the circuit element ID. Still further, in order to indicate that an affected circuit block belongs to the same circuit block, Step device No, of the same circuit block is set in Step No. of flowchart information at a rightmost column of FIG. 8.

Here, Block 0 of the circuit element information 162 in FIG. 8 will be analyzed for example. Circuit element ID 1 for which the circuit element extract information is "Condition" is extracted to generate a next flowchart element as indicated in the rightmost column in FIG. 8. Still further, because Step device No. "0" is set in the circuit element extract information of Circuit element ID 0 of the block 0, "0" is set in Step No. of a generated flowchart element as indicated in the rightmost column in FIG. 8.

In Step S1405 in FIG. 14, the circuit element information 162 is analyzed. Here, the flowchart elements are connected by using a relationship between Step device No of the circuit element extract information and Next step device No. in FIG. 12. For instance, ID of a flowchart element corresponding to a next flowchart element is set as a next flowchart element of the flowchart element extracted in Step S1403. In this case, it is assumed that a circuit element having equal Step device No. with a Next step device No. in the circuit element extract information of the circuit element has a connection relation. Then, Flowchart element ID is set to a next flowchart element of the flowchart element corresponding to the circuit element ID having the connection relation through the circuit element. For example, Circuit element IDs 1, 2, 3 and 5 of the circuit element information 162 in FIG. 8, i.e., second through fifth lines in FIG. 8 are analyzed. In this case, because the circuit element extract information of Circuit elements ID 2 and 3 are "Next step device No.=1" and "Step device No.=1", respectively, there exists the connection relation from Circuit element ID2 to Circuit element ID 3, Still further, because Circuit elements ID 1 and 5 have the connection relation through Circuit elements ID 2 and 3, Flowchart element ID 5 corresponding to Circuit element ID 5 is set to Next flowchart element of Flowchart element ID 1 corresponding to Circuit element ID 1.

Figure 15:
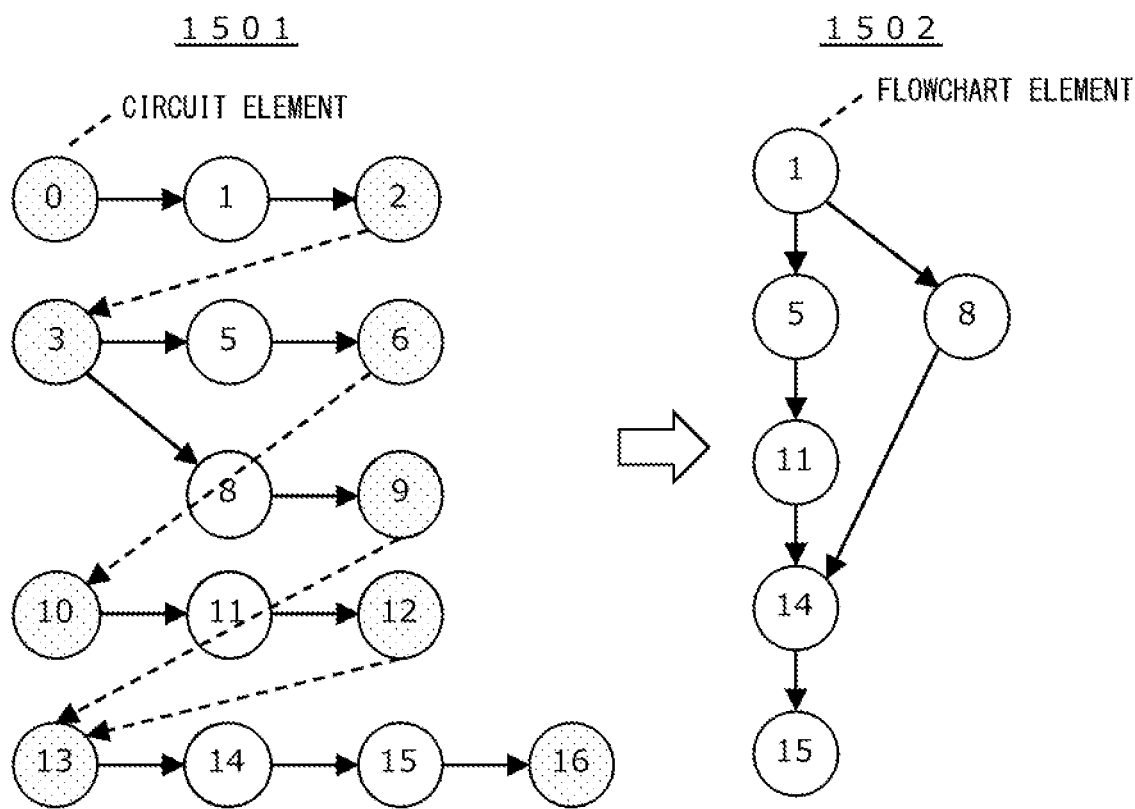
FIG. 15 illustrates a method for setting a next flowchart element of a flowchart element from the circuit element information of the present exemplary embodiment.

FIG. 15 visually illustrates the method for setting a next flowchart element of a flowchart element from the circuit element information in Step S1405 in FIG. 14. A relationship diagram 1501 between circuit elements on a left side of FIG. 15 sets Circuit elements ID as nodes in the circuit element information 162 and indicates connection relations among the circuit elements based on IDs of next circuit elements. A relationship diagram 1502 among the flowchart elements on a right side of FIG. 15 sets Flowchart elements ID as nodes and indicates connection relations among the flowchart elements generated through Step S1405.

Meanwhile, the processes of Steps S1401 through S1405 are executed also on the ladder program information 171 by the flowchart information generation processing unit 142 to generate a flowchart 1702 after the change in FIG. 17. If the flowchart information before and after the change can be generated, it is possible to output flowcharts 1701 and 1702 in FIG. 17 into which the difference information before and after the change is applied through the user interface, i.e., the display processing unit 120 or the input processing unit 130 in FIG. 1.

One example of an arrangement for outputting or displaying the flowcharts including the difference information before after the change will be described below.

Figure 16:
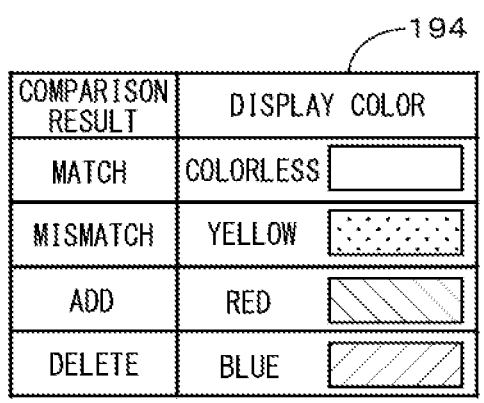
FIG. 16 illustrates one example of display color definition information of the present exemplary embodiment.

FIG. 16 illustrates one example of the display color definition information 194 in outputting, e.g., displaying, the flowcharts including the difference information before and after the change. The display color definition information 194 defines symbolic display colors of the flowchart with respect to the comparison result of the ladder program difference information 180 in FIG. 6. As illustrated in FIG. 17, the flowcharts 1701 and 1702 before and after the change are displayed in a form of juxtaposing the both horizontally. Then, the flowchart difference information 180 is rendered on the display area 1700 in accordance to definition of precedents of the display color definition information 194.

Note that the display color definition information 194 in FIG. 16 defines to display "Match" of the flows or program steps before and after the change in colorless, i.e., default display color, "Mismatch" by yellow, "Add" by red and "Delete" by blue. That is, the difference information of the flowcharts or the ladder programs is presented by displaying by the different colors. It is noted that the yellow serves as first information indicating that a flow before the change does not match the flow before the change, the red serves as second information indicating that a new flow is added before and after the change, and the blue serves as third information indicating that a flow has been deleted in the present embodiment.

However, the form of presenting the difference information of the flowcharts or ladder programs is not limited to that, and a person skilled in the art can arbitrarily adopt any form. For instance, it is conceivable to adopt a method of setting different highlighting display modes to elements corresponding to "Match" and "Mismatch" before and after the change, "Add" and "Delete". It is possible to represent the difference information of the flowcharts or the ladder programs by using the highlighting display format using different highlighting display modes. The different display colors described above may be considered, in some cases, to be one of the highlighting formats. Still further, as the highlighting display format used for displaying the difference information, various highlighting display modes may be utilized by changing display brightness, types of character fonts, character font size and fonts such as italic and bold. It is also possible to display the difference information conspicuously from other parts by using not only a single highlighting display format but also by combining a plurality of highlighting display formats.

FIG. 17 illustrates one example of a display format on the display area 1700 of the flowchart comparing apparatus. In a case of FIG. 17, the ladder programs before and after the change are displayed side by side at an upper part of the display area 1700 and the flowcharts 1701 and 1702 before and after the change are displayed side by side at a lower part of the display area 1700. Then, these two respective ladder programs and flowcharts before and after the change contain parts having respective display colors changed in accordance to the display color definition information 194 in FIG. 16, i.e., the difference information of the flowcharts or the ladder programs.

Figure 18:
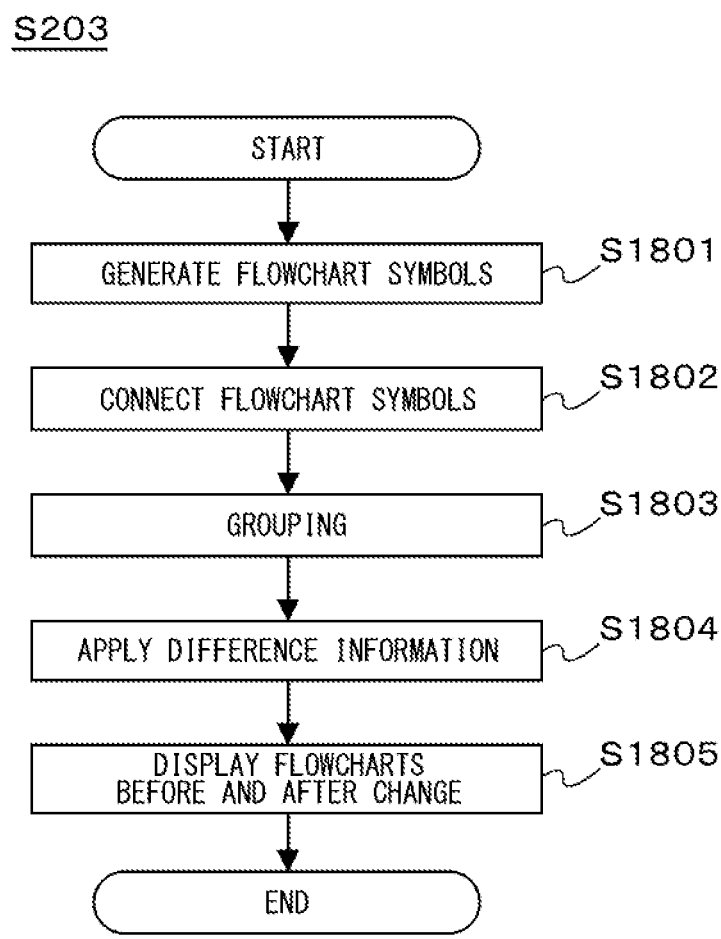
FIG. 18 is a flowchart illustrating a flow of a flowchart displaying process of the present exemplary embodiment.
Figure 19:
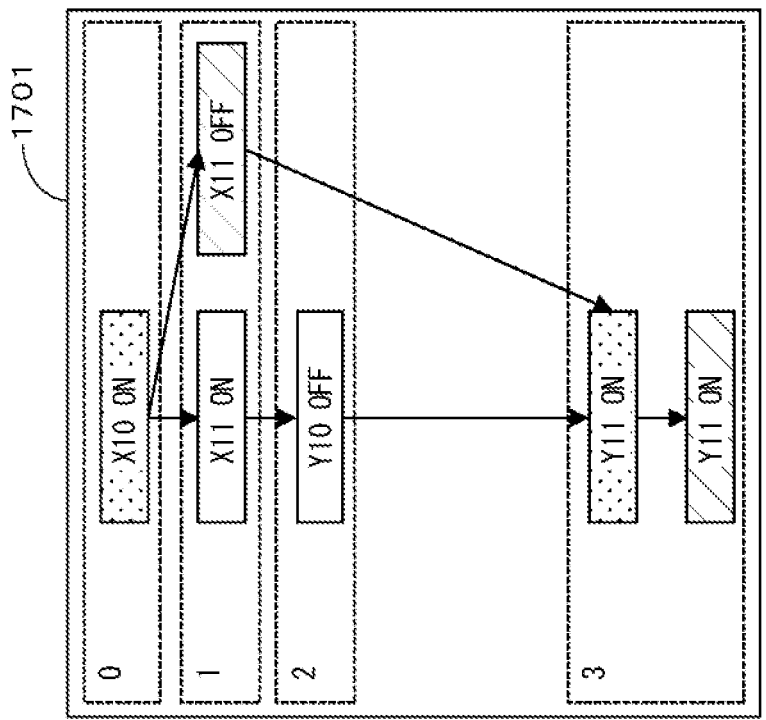
FIG. 19 illustrates one example of conversion from flowchart information to a flowchart of the present exemplary embodiment.

FIG. 18 illustrates a flow of processes of the flowchart display processing unit 143 in FIG. 1 describing Step S203 in FIG. 2 in detail. FIG. 19 illustrates a manner of conversion from the flowchart information to a flowchart executed by the process in FIG. 18. The flowchart display processing unit 143 in FIG. 1 generates the flowcharts before and after the change into which the difference information is applied from the ladder program difference information and the flowchart information before and after the change as illustrated in FIG. 19 and displays them on the display processing unit 120.

In Step S1801 in FIG. 18, a flowchart element of the flowchart information is replaced to a flowchart symbol, and a circuit element usage of a circuit element ID corresponding to a flowchart element ID is denoted by the flowchart symbol.

In Step S1802, the flowchart symbols are connected by arrow lines based on IDs of next flowchart elements of the flowchart elements.

In Step S1803, flowchart symbols having equal Step No. are grouped and are denoted by Step No. based on Step No. of the flowchart information.

In Step S1804, the difference information is applied to the flowchart based on the ladder program difference information. The ladder program line No. is tracked from the flowchart element ID from correspondence of the flowchart element ID and the circuit element ID in the flowchart information and from correspondence of the circuit element ID and the ladder program line No. in the circuit element information. It is, thereby, possible to acquire the comparison result from the ladder program difference information. Then, the flowchart symbols are colored and are displayed in accordance to the display color definition information 194 in FIG. 16 from the acquired comparison result. Steps S1801 through S1804 are processed in the same manner on the ladder programs before and after the change to generate the flowcharts 1701 and 1702 before and after the change.

In Step S1805, the ladder program difference information 180, the flowchart 1701 before the change and the flowchart 1702 after the change generated up to Step S1804 are displayed side by side as illustrated in FIG. 17. The ladder program difference information 180 is displayed also by coloring each line in response to the comparison result based on the display color definition information 194.

According to the present exemplary embodiment, it is possible to represent the flowcharts before and after the change containing the difference information in a juxtaposed fashion as illustrated in FIG. 17 by the processes described above. The flowchart representation as illustrated in FIG. 17 enables to readily grasp contexts of different parts. It is also possible to readily specify the different parts of the ladder programs and to grasp the influential range from the contexts of the different parts by the flowchart representation as illustrated in FIG. 17. For instance, it is possible to clearly understand whether the changed part of the ladder program changed in the field-work affects other control step through the flowchart representation applied with the difference information by visually recognizing the flowchart representation as illustrated in FIG. 17.

The present disclosure can be realized also by processes of supplying a program realizing one or more embodiments described above to a system or to an apparatus through network or a storage medium and of reading and executing the program by one or more processing units in the system or the apparatus. The present disclosure can be realized also by a circuit, e.g., ASIC, realizing one or more functions.

Still further, while the ladder program has been exemplified as the object program for outputting the flowchart as described above, the object program is not limited to be the ladder program and it is needless to say that the present disclosure can be carried out in the same manner by any control program. Still further, the display output format by the display unit has been mainly illustrated as the mode for outputting the flowchart as described above. However, there is a possibility of being able to use a printing apparatus or a sound outputting apparatus as a user interface for outputting the flowchart. That is, a configuration of the user interface to that end is arbitrary as long as the flowchart is outputted to the user.

Still further, while the flowcharts and the ladder programs before and after the change have been displayed while being horizontally juxtaposed in the case of FIG. 17, this display format is one example to the end. There is a possibility of being able to represent the difference of the ladder programs and the flowcharts by the representation of display colors and highlighting display without always juxtaposing the two flowcharts and ladder programs. For instance, while there is a form such as unified diff as a form of presenting a difference in a program text, this sort of difference presenting form may be utilized in presenting the flowchart difference. For instance, it is possible to present differences by presenting by specific display colors or by highlighting for parts deleted or changed based on a flowchart before the change. As for addition of a flow or a branch, it is possible to display the difference by adding an added element by utilizing an empty space of the flowchart. As for the ladder programs, it is not necessary to always output and juxtapose the two ladder programs. If the ladder program related to the change is to be outputted in a text representation as illustrated in FIG. 17, it is possible to output a text of single-column by using a known output form such as unified diff (udiff) and context diff (cdiff).

Still further, the exemplary embodiment described above is applicable to a machine that can automatically make a telescopic motion, bending and stretching motions, a vertical motion, a horizontal motion or a swiveling motion or their complex motion based on information of a storage device provided in the control unit as an object to be controlled by the ladder circuit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processing units (e.g., central processing unit (CPU), micro processing unit (MPU)) and may include a network of separate computers or separate processing units to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-049594, filed Mar. 19, 2020, which is hereby incorporated by reference herein in its entirety.

What is claimed is:

1. An information processing apparatus comprising:
a processor configured to execute a control program to acquire (i) difference information between a first program and a second program changed from the first program, (ii) a first flowchart corresponding to the first program, and (iii) a second flowchart corresponding to the second program,
wherein the processor is configured to display the first program, the second program, the first flowchart, and the second flowchart on a display portion in a display format based on the difference information,
wherein a change from the first program to the second program is performed by editing a ladder chart corresponding to the first program by a user, and
wherein the first program and the second program are displayed on the display portion in a mnemonic form.

2. The information processing apparatus according to claim 1, wherein the processor is configured to output the difference information on the display portion by a display format of highlighting and/or of different colors.

3. The information processing apparatus according to claim 1, wherein the processor is configured to output (a) first information indicating that a predetermined flow in the first flowchart does not match a predetermined flow in the second flowchart, (b) second information indicating that a new flow is added in the second flowchart and (c) third information indicating that a predetermined flow has been deleted by applying to the first flowchart and the second flowchart as the difference information.

4. The information processing apparatus according to claim 3, wherein the first information, the second information and the third information are output while being applied to the first flowchart and the second flowchart—with different colors.

5. The information processing apparatus according to claim 1, wherein the first program and the second program are a first ladder program and a second ladder program changed from the first ladder program; and
   wherein the control program comprises:
      a flowchart generating portion configured to generate the first flowchart and the second flowchart from the first ladder program and the second ladder program; and
      a ladder program comparison processing unit configured to compare the first ladder program and the second ladder program to generate ladder program difference information between the first ladder program and the second ladder program, and
   wherein the processor is configured to output the first flowchart and the second flowchart into which the difference information is being applied on the display portion based on the first flowchart and the second flowchart and the ladder program difference information.

6. A production system comprising:
   the information processing apparatus according to claim 5, and
   a sequence control unit configured to control production devices based on the first ladder program and the second ladder program, and
   wherein the production system is configured to manufacture articles by the production devices.

7. An article manufacturing method manufacturing an article by using the production system according to claim 6.

8. An information processing method executed by a processor configured to execute a control program, the information processing method comprising:
   acquiring (i) difference information between a first program and a second program changed from the first program, (ii) a first flowchart corresponding to the first program, and (iii) a second flowchart corresponding to the second program; and
   displaying the first program, the second program, the first flowchart, and the second flowchart on a display portion in a display format based on the difference information,
   wherein a change from the first program to the second program is performed by editing a ladder chart corresponding to the first program by a user, and
   wherein the first program and the second program are displayed on the display portion in a mnemonic form.

9. The information processing method according to claim 8, wherein the difference information is output on the display portion by a display format of highlighting and/or of different colors.

10. The information processing method according to claim 8, further comprising:
    outputting (a) first information indicating that a predetermined flow in the first flowchart does not match a predetermined flow in the second flowchart, (b) second information indicating that a new flow is added in the second flowchart and (c) third information indicating that a predetermined flow has been deleted by applying to the first flowchart and the second flowchart as the difference information.

11. The information processing method according to claim 10, wherein the first information, the second information and the third information are output while being applied to the first flowchart and the second flowchart with different colors.

12. A non-transitory computer-readable storage medium configured to store a control program capable of executing the information processing method according to claim 8 by a computer.

* * * * *